United States Patent [19]

Lehrmund et al.

[11] 4,346,960

[45] Aug. 31, 1982

[54] BINOCULAR TELESCOPE HAVING A DOUBLE-JOINT CONNECTING BRIDGE

[75] Inventors: Willi Lehrmund, Leun; Erwin Altenheiner, Waldsolms, both of Fed. Rep. of Germany

[73] Assignee: Carl Zeiss-Stiftung, Oberkochen, Fed. Rep. of Germany

[21] Appl. No.: 211,654

[22] Filed: Dec. 1, 1980

[30] Foreign Application Priority Data

Dec. 1, 1979 [DE] Fed. Rep. of Germany ....... 2948421

[51] Int. Cl.³ .............................................. G02B 7/06
[52] U.S. Cl. ......................................... 350/76; 350/47
[58] Field of Search ...................... 350/36, 46, 47, 73, 350/74, 76, 77

[56] References Cited

U.S. PATENT DOCUMENTS

| | | | |
|---|---|---|---|
| 2,285,388 | 6/1942 | Benard | 350/76 |
| 2,811,895 | 11/1957 | Jensen | 350/76 |
| 4,030,808 | 6/1977 | Hornschu et al. | 350/76 X |
| 4,080,042 | 3/1978 | Hornschu et al. | 350/76 X |
| 4,162,820 | 7/1979 | Schwab et al. | 350/77 X |
| 4,202,598 | 5/1980 | Jenkins | 350/76 X |

Primary Examiner—John K. Corbin
Assistant Examiner—Matthew W. Koren
Attorney, Agent, or Firm—Hopgood, Calimafde, Kalil, Blaustein & Judlowe

[57] ABSTRACT

The invention contemplates a binocular telescope wherein a bridge interconnects offset arms of separate individual telescope housings on spaced articulation axes, to enable compact folding of the telescopes along opposite sides of the bridge, when not in use. A first single control element provides ganged positioning control of corresponding focusing optical elements within both the respective telescope housings, and a second single control element provides independent adjustment of the focusing optical element within one to the exclusion of the other telescope housing. In the specific disclosed embodiment, a spring-loaded lost-motion connection between the ganged control structure and the mount for the focusing optical element enables the second single control element to provide for adjusted single-eye corrective accommodation without affecting the ganged focusing displacement produced by adjustment of the first single control element.

7 Claims, 3 Drawing Figures

BINOCULAR TELESCOPE HAVING A DOUBLE-JOINT CONNECTING BRIDGE

BACKGROUND OF THE INVENTION

The present invention relates to a binocular telescope having a double-articulation connecting bridge between the individual telescopes, in which optical parts serving for focusing in each individual telescope housing are held by a mount which is axially displaceable but secured against turning within the housing and is connected via an arm with an axially displaceable swivel shaft pin guided in one of the swivel shafts and in which a single actuating member is operative in a focusing operation to shift both swivel shaft pins and thereby equally adjust the position of the displaceable optical parts of both telescopes.

In such telescopes, it is desirable, in addition to the joint focusing of both individual telescopes, to provide for focusing which acts only on one telescope and by means of which defective vision on the part of the user can be compensated for in one eye.

It is already known in the case of single-joint (i.e., single articulation connection) binocular telescopes to provide a drive knob for the joint focusing of both individual telescopes on that end of the joint bridge which faces the eye of the user and a rotary knob for individual focusing on the other end of the joint bridge. Such a solution cannot be transferred to binocular telescopes with a double-joint bridge; furthermore, it is also not easy to operate.

West German Pat. No. 2,233,055 and corresponding U.S. Pat. No. 4,080,042 disclose a binocular telescope with double-joint bridge in which the joint focusing of both individual telescopes is effected by a drive knob arranged in a connecting bridge and in which an ocular or an objective can be made individually adjustable in order to compensate for a visual defect on the part of the user. This individual adjustment is customarily effected by means of a rotating ring on one of the individual telescopes. Aside from the fact that individual adjustment of an ocular or objective presents difficulties in connection with the sealing off of the corresponding individual telescope, this solution is also not easy to operate.

BRIEF STATEMENT OF THE INVENTION

The object of the present invention is so to develop a binocular telescope having a double-articulation connecting bridge between the individual telescopes that both joint focusing and individual focusing can be effected by the user without putting the telescope down, and that upon both focusing operations only the same optical elements, arranged in each case between ocular and objective, need be moved.

It is also an object to achieve the above object with structure which fully encloses all focus adjusting parts, except for external exposed means for controllably operating the same.

This object is achieved in the case of a double telescope of the aforementioned type in the manner that on the side facing the observer a first drive knob is arranged on one swivel shaft while on the other swivel shaft a second drive knob is arranged, that the first drive knob is connected via a thread connection in form-locked manner with the first swivel-shaft pin which engages by an extension into a plate which is supported for axial displacement in the connecting bridge, that the second swivel shaft pin is coupled via spring force in form-locked manner with a sleeve which is guided in the swivel shaft and is axially displaceable by the plate, and that the second drive knob is connected via a coupling (which serves for the transmission of its rotary movement but permits axial movement) with a threaded pin which is displaceably and rotatably mounted in the axially displaceable sleeve and threadedly engages a sleeve portion of the second swivel shaft pin.

During observation, the user holds a binocular telescope with both hands so that in the case of the binocular telescope of the present invention both drive knobs can be operated in simple fashion, without putting the telescope down.

Upon the turning of the first drive knob, the user effects a joint focusing, i.e., an adjustment of the telescope to a desired distance of observation. In this connection, the two swivel shaft pins and the focusing elements connected therewith are axially simultaneously displaced by the same amount within the two individual telescopes.

Upon actuation of the second drive knob, only the second swivel shaft pin and the focusing element connected with it are axially displaced. In this case, it is only the distance between the focusing element connected with the second swivel shaft pin and the member serving for the transmission of the joint focusing movement that is changed.

DETAILED DESCRIPTION

The invention will be described in further detail below with reference to the accompanying drawings, showing an illustrative embodiment, as follows.

Figure 1:
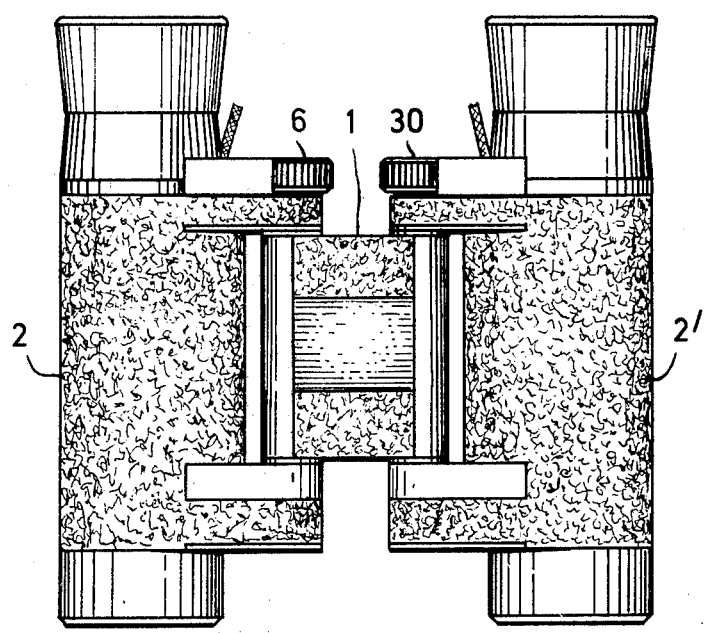
FIG. 1 is a plan view of a binocular telescope of the invention, in condition for use.

In FIG. 1, the numerals 2 and 2' identify the housing of two individual telescopes which are connected with each other by a double-joint (i.e., double-articulation) connection bridge 1. One of the hinge shafts 12 supports a drive knob 6 which serves for the joint (i.e., ganged) focusing of the two individual telescopes. The other hinge shaft 12' is provided with a drive knob 30 by means of which a separate focusing of the individual telescope 2' may be effected, to compensate for a defect of the eye of the user. Both swivel shafts 12-12' are hollow, i.e., tubular.

Figure 2:
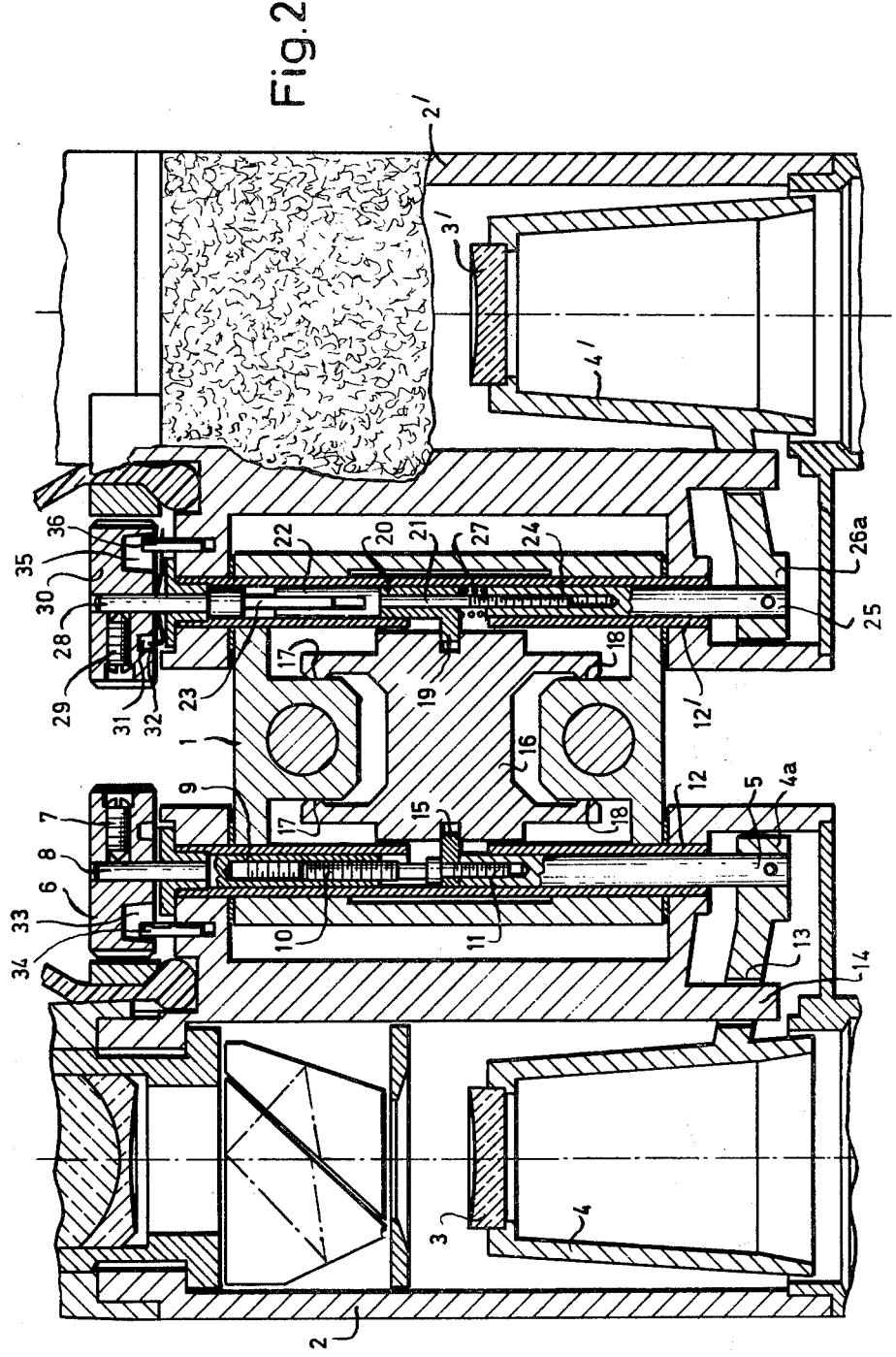
FIG. 2 is an enlarged view similar to FIG. 1, but partly broken-away and in longitudinal section through the telescope of FIG. 1.

For joint focusing of both individual telescopes 2-2', optical elements 3-3' arranged therein, in each case between an objective and an ocular, are simultaneously axially displaceable, while for separate focusing of the individual telescope 2' only the element 3' contained therein is axially displaceable. FIG. 2 serves to further explain the manner of operation.

The drive knob 6 is connected by a set screw 7 to a pin 8 whose lower part is developed as an internally threaded sleeve 9. Into this sleeve there is introduced, secured against rotation, a threaded pin 10 whose lower end is connected firmly via a threaded connection 11 with a first swivel shaft pin 5. Pin 10 is supported for axial displacement in the bore of the swivel shaft 12. The lower end of swivel shaft pin 5 is connected with an arm 4a of the mount 4, which bears the focusing element 3. Arm 4a is furthermore provided with a guide bore 13 which engages a guide pin 14 fixed to the housing, thus securing the mount 4 against rotation.

The swivel shaft pin 5 is provided at its upper end with a lateral projection 15 which engages a recess in a slide part 16 supported in the connecting bridge 1. The slide part 16 is axially displaceable via longitudinal guides 17-18. On its right hand side, the slide part 16 is provided with a recess which engages a lateral projection 19 of a sleeve 20 which is supported for axial displacement in the bore of the right-hand swivel shaft 12'.

The sleeve 20 is provided with a central bore in which a cylindrical pin 21 is rotatably supported. The upper end of pin 21 is developed as a fork into which a tongue 23 engages, in such a manner that (a) the fork is axially displaceable with respect to the tongue but (b) upon rotation of the tongue 23 the fork 22 and thus the cylindrical pin 21 will also be rotated.

The lower end of pin 21 is threaded at 24 for engagement with the threaded bore of the upper sleeve-like end of a second swivel shaft pin 25. Pin 25 is also axially displaceable in the hollow shaft 12'.

The lower end of the swivel shaft pin 25 is connected with an arm 26a of a mount 4', which carries the focusing element 3'.

For the force-locked connection of the axially displaceable sleeve 20 with the swivel shaft pin 25, a compression spring 27 is provided between the two of them.

Figure 3:
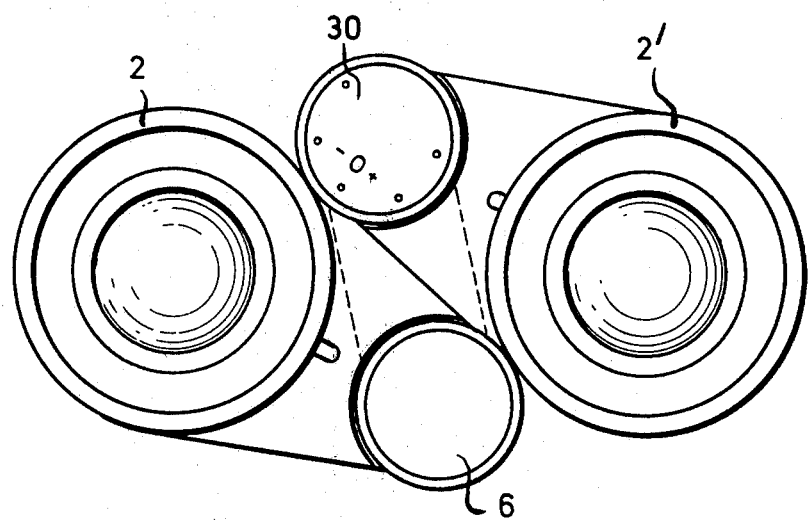
FIG. 3 is a top-end view, from the eyepiece end of the telescope of FIG. 1, in collapsed, packed condition.

The tongue 23 which engages into the fork 22 is part of a pin 28 which is firmly connected to the drive knob 30 by a set screw 29. The drive knob 30 is provided with a recess 31 into which there engages a spring-loaded detent element 32, thus marking a zero or reference position of the drive knob 30. This zero position, as shown in FIG. 3, is marked on the top of the drive knob 30, which also bears a diopter scale.

The drive knobs 6 and 30 are provided with sector-shaped recesses 33 and 35 engaged by stop pins 34-36 secured to their respective housings, thereby limiting the range of rotation of the drive knobs.

For joint focusing of the two individual telescopes 2-2', the drive knob 6 is turned. In this way, the threaded sleeve 9 is also turned, so that the threaded pin 10 is displaced axially. Pin 10 carries the swivel shaft pin 5 along with it and thus also the focusing element 3 via the arm 4a. The axial movement of the swivel shaft pin 5 is also transmitted via lateral extension 15 to the slide part 16, which is thus shifted axially in the bridge 1. By means of the lateral projection 19, the slide part 16 carries sleeve 20 in the right hand swivel shaft 12' along with it. If the sleeve 20 is moved downward via the slide part 16 it carries the swivel shaft pin 25 along with it via the spring 27 and thus also the focusing element 3'. If sleeve 20 is moved upward, the swivel shaft pin 25 is carried along via the threaded pin 24, since spring 27 assures that the upper end of sleeve 20 and the lower end of fork 22 remain in contact.

Upon rotation of the drive knob 6, the focusing elements 3—3' in the individual telescopes 2—2' are thereby jointly displaced axially to identical extents.

For individual focusing, the drive knob 30 is rotated; in this connection, pin 28, the tongue 23 connected with it, and thus fork 22, are also rotated. Thus, the threaded pin 22 turns in the threaded sleeve of the swivel shaft pin 25 and thereby changes the distance between sleeve 20 and the swivel shaft pin 25, it being noted that spring 27 at all times assures a force-locked connction. It follows that, upon rotation of drive knob 30 only the focusing element 3' in the individual telescope 2' is displaced axially, thus enabling compensation adjustment for the defective vision of the user.

What is claimed is:

1. A binocular telescope having a double-joint connecting bridge (1) between the individual telescopes (2—2') in which optical parts (3—3') serving for focusing in each individual telescope housing are held by a mount (4—4') which is axially displaceable but secured against turning within the housing, the mount being connected via an arm (4a, 26a) with a swivel shaft pin (5-25) which is axially displaceable and guided in one of the swivel shafts (12-13') and in connection with which the swivel shaft pins corresponding to the two swivel shafts are displaced axially together by equal amounts for joint focusing via an actuating member (6), characterized by the fact that on the side of one swivel shaft (12) facing the observer a first drive knob (6) is arranged while on the other swivel shaft (12') a second drive knob (30) is arranged, that the first drive knob (6) is connected via a threaded connection (9-10-11) in form-locked manner with the first swivel shaft pin (5) which via an extension (15) engages into a plate (16) which is supported in axially displaceable manner in the connecting bridge (1), that the second swivel shaft pin (25) is coupled via a spring (27) in force-locked manner with a sleeve (20) which is guided in the swivel shaft (12) and is axially displaceable by the plate (16), and that the second drive knob (30) is connected via a coupling (22-23), which serves for the transmission of its rotary movement but permits axial movement, with a threaded pin (24) which is supported in turnable and displaceable manner in the sleeve (20) and engages into a threaded sleeve in the second swivel shaft pin (25).

2. A binocular telescope according to claim 1, characterized by the fact that the second drive knob (30) is permanently connected to a pin (28) whose lower end is developed as tongue (23), and that the threaded pin (24) which engages in the second swivel shaft pin (25) is developed at its upper end as a fork (22) which surrounds the tongue (23) in axially displaceable manner but firmly coupled with respect to the rotation thereof.

3. A binocular telescope according to claim 1, characterized by the fact that the second drive knob (30) is provided with a recess (31) into which a detent (32) serving to fix the zero position engages under spring action.

4. A binocular telescope comprising first and second individual telescope housings each having an offset hinge arm, and a bridge having pivotal connection on spaced parallel axes to the respective hinge arms of said housings, each of said housings containing an internal axially displaceable focusing optical element; a first single manually accessible control element and associated motion-transmitting structure traversing said bridge and foldable on said parallel axes for transmitting identical axial displacements to said internal optical elements, there being an axially fixed connection between said structure and one of said focusing optical elements and an axially variable connection between said structure and the other of said focusing optical elements, and a second single manually accessible control element and associated motion-transmitting structure including means associated with said axially variable connection for selectively varying the axial position of the other of said focusing optical elements to the exclusion of said one optical element.

5. A binocular telescope according to claim 4, in which one of said control elements is mounted in the relative vicinity of one to the exclusion of the other of said telescope housings for finger manipulation via one hand when holding said one telescope housing and the other of said control elements is mounted in the relative vicinity of the other of said telescope housings to the exclusion of said one of said telescope housings for finger manipulation via the other hand when holding said other telescope housing.

6. A binocular telescope according to claim 5, in which one of said control elements is a knob rotatable on one of said spaced axes and the other of said control elements is a knob rotatable on the other of said spaced axes, all axial displacements of said motion-transmitting structures being via knob-driven threaded means on said respective axes.

7. A binocular telescope according to claim 4, in which tubular hinge shafts connect said bridge to said housing arms, all axially displaceable structure being contained within said housings and within said shafts and within said bridge.

* * * * *